(No Model.)  3 Sheets—Sheet 2.
J. H. JENSEN.
CHECK ROW PLANTER.
No. 375,875.  Patented Jan. 3, 1888.
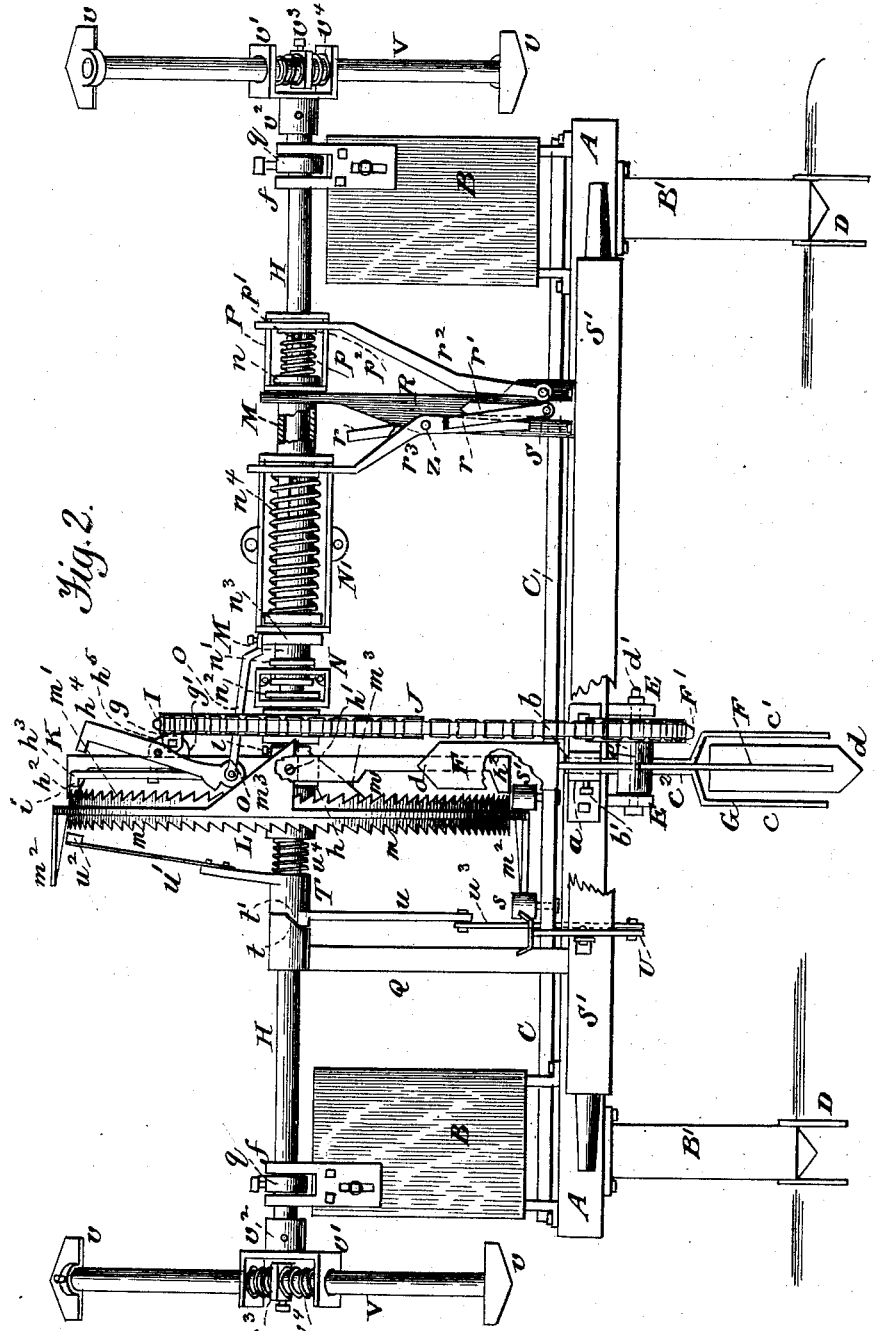
Witnesses.
A. Ruppert
A. C. Rawlings
Inventor.
Jens H. Jensen
Per
Thomas P. Simpson (No Model.) 3 Sheets—Sheet 3.
J. H. JENSEN.
CHECK ROW PLANTER.
No. 375,875. Patented Jan. 3, 1888.
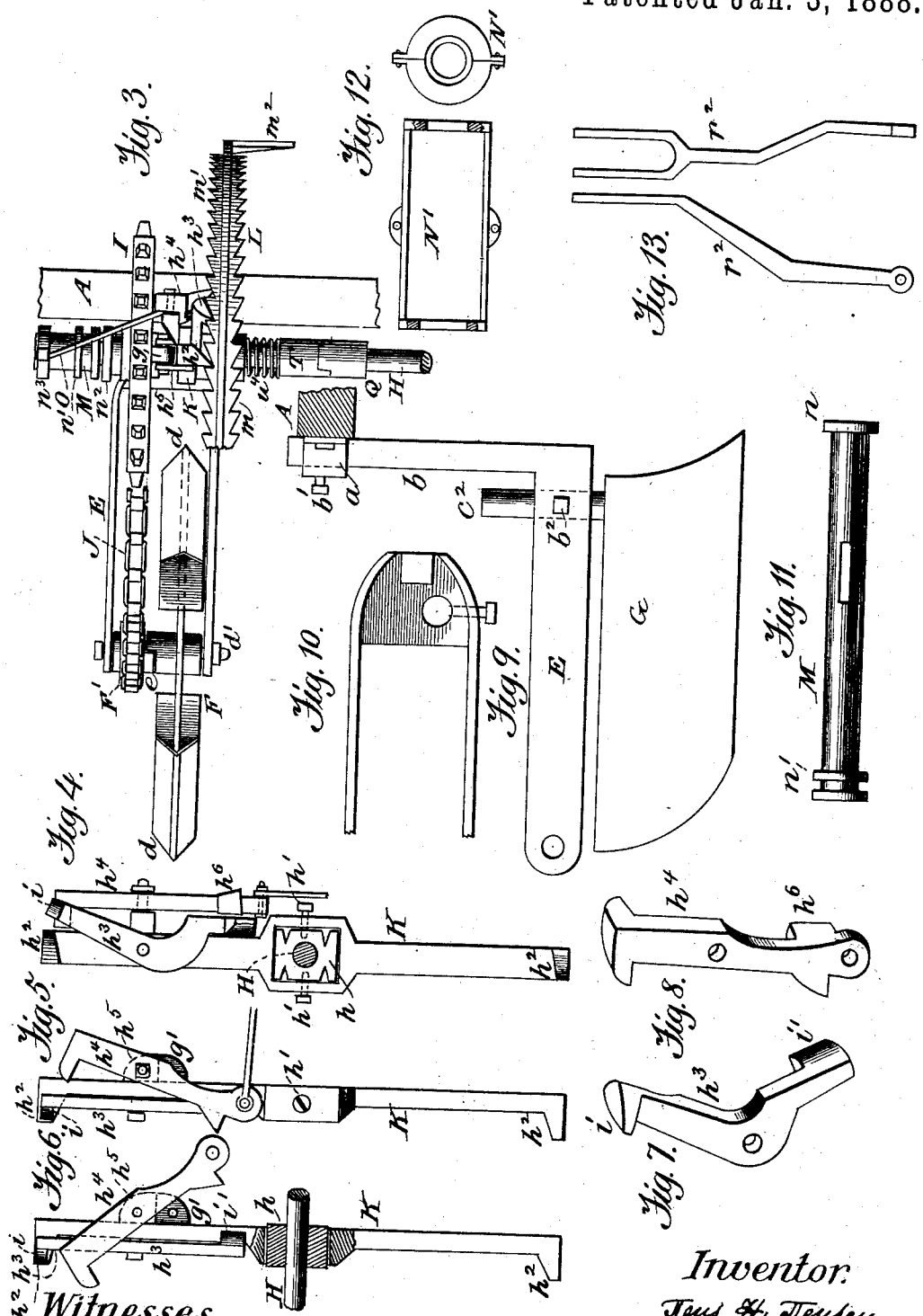
Witnesses.
A. Ruppert,
A. C. Rawlins.
Inventor.
Jens H. Jensen,
Per
Thomas P. Simpson
Atty.

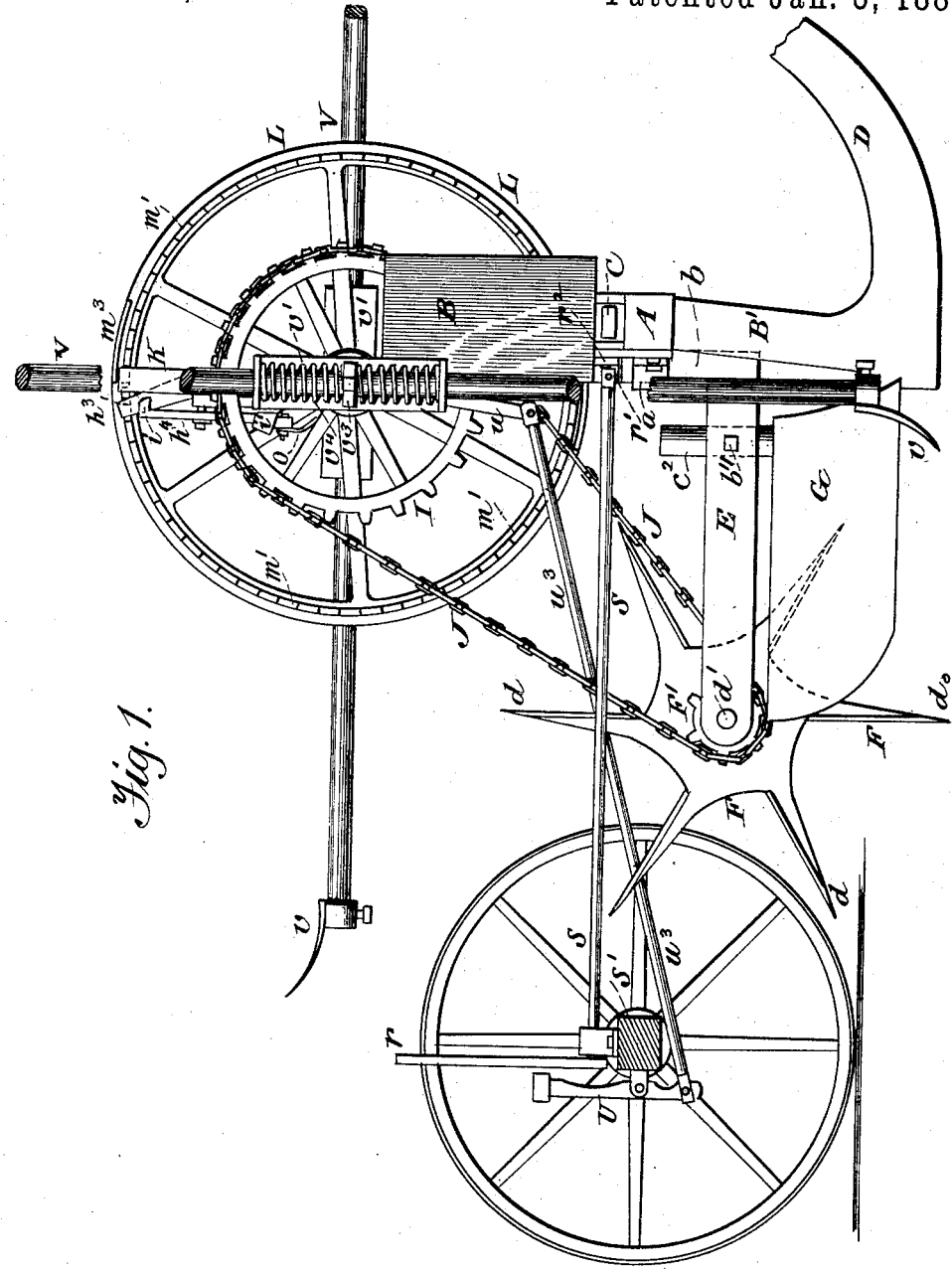

UNITED STATES PATENT OFFICE.

JENS HANSEN JENSEN, OF MINDEN, NEBRASKA.

CHECK-ROW PLANTER.

SPECIFICATION forming part of Letters Patent No. 375,875, dated January 3, 1888.

Application filed October 29, 1887. Serial No. 253,759. (No model.)

*To all whom it may concern:*

Be it known that I, JENS HANSEN JENSEN, a citizen of the United States, residing at Minden, in the county of Kearney and State of Nebraska, have invented certain new and useful Improvements in Check-Row Planters; and I do hereby declare the following to be a full, clear, and exact description of the invention, such as will enable others skilled in the art to which it appertains to make and use the same.

This invention relates to check-row planters; and it consists in certain improvements in the construction of the same, as hereinafter described and claimed.

In the accompanying drawings, Figure 1 is a side view of a check-row planter with my improvements applied thereto, certain parts being removed. Fig. 2 is a rear view showing with other parts the main operating shaft and the devices mounted thereon. Fig. 3 is a partial plan view. Figs. 4, 5, and 6 illustrate the ratchet devices carried by the main shaft. Figs. 7, 8, and 9 represent certain details. Figs. 10, 11, 12, 13 are detail views of parts hereinafter particularly described.

A designates the cross-beam, on which are mounted the seed-boxes B and the sliding seed-bar C, which passes through the lower part of the seed-boxes, the beam A, with drill-tubes B' secured thereto, being carried by the runners D of the planter, as shown.

Centrally on the rear side of beam A is fastened a yoke or socket, $a$, through which is passed the vertical neck or standard $b$ of a yoke, E, the standard being secured by a set-screw, $b'$. The yoke E extends rearward, being in a horizontal position, and sufficiently elevated for the attachment of a pronged traction-wheel, F, and a leveling-plow, G, the latter being bifurcated or provided with two mold-boards, $c\ c'$, and having a vertical neck, $c^2$, which extends through an aperture in yoke E near its forward end, being secured by a set-screw, $b^2$. The traction-wheel F, provided with shovel-points $d$, is mounted on a bolt or small shaft, $d'$, carried by a yoke, E, at its rear ends, so that in the rotary movement of wheel F its prongs or spokes move downward between the mold-boards of the plow G. On shaft $d'$ of traction-wheel F, and adjacent to said wheel, is placed a small sprocket-wheel, F', and the hubs of both wheels F and F' are shouldered, as seen at $e$, so as to engage one with the other, motion being thus imparted from F to F'.

H indicates a horizontal shaft mounted above beam A and provided with bearings $f$, secured to the seed-boxes B. On shaft H is loosely placed a large sprocket-wheel, I, which is connected by chain J with wheel F', and is provided with a laterally-projecting lug, $g$, by which it is connected with a ratchet device, as hereinafter stated.

K indicates a two-arm ratchet device, which is mounted on the operating-shaft H, and is provided with the lugs $g'$, with which the lug $g$ on sprocket-wheel I is pivotally connected. Midway of the ratchet K is a rectangular opening, in which is placed a block, $h$, which has a central aperture, through which the shaft H passes. The ratchet is pivoted to the block by means of two set-screws, $h'$, so that the ratchet is allowed a slight lateral swinging movement. Each end of the ratchet is of angular form, and has a laterally-projecting tooth, $h^2$, to engage with the laterally-projecting teeth of an adjacent wheel, L, on the shaft H.

Pivoted to ratchet K near one end thereof and on the side toward wheel L is a supplementary ratchet, $h^3$, which has on its outer end a laterally-projecting tooth, $i$, and at its inner end a beveled projection, $i'$. A ratchet-dog, $h^4$, with an angular beveled projection at its outer end, is pivoted to an offset or projection, $h^5$, on ratchet K. The inner end of the dog is formed with a beveled projection, $h^6$, and is perforated for the attachment of a connecting-rod. The rocking movement of the dog $h^4$ is across the rear edges of ratchets K and $h^3$. In its forward movement the upper part of the dog bears against ratchet $h^3$ at its outer end, pressing it forward to engagement with wheel L, and in its backward movement the beveled projection $h^6$ bears against the projection $i'$ on ratchet $h^3$, pressing the inner end forward and forcing the ratchet backward. The block $h$, which carries the ratchet K, is secured in place on shaft H by a collar, $l$, and set-screw on one side and by the hub of wheel L on the other.

The wheel L, adjacent to ratchet K, is fast on shaft H by means of a set-screw, and near its periphery the wheel is provided with ratchet-teeth $m'$ on one side for engagement with ratchet K, and similar teeth, $m$, on the opposite side, for the purpose hereinafter set forth. On the periphery of said wheel are four angular projections, two of them, $m^2$, extending laterally in one direction, and the other two projections, $m^3$, extending laterally in the opposite direction, the purpose of said projections being to engage with devices on the sliding seed-bar.

M designates a sleeve or connecting-tube placed on shaft H, and having on its outward end an annular flange or swivel-head, $n$, and on its inner end a grooved swivel-head, $n'$. The tube M is connected with the hub of sprocket-wheel I by means of a swivel, N, one end of which rests in the groove of swivel-head $n'$, the other end being held by a swivel-head, $n^2$, on the hub of sprocket-wheel I. A larger swivel, N', is placed on tube M, the inner end of the swivel resting between the flanges of a swivel-head, $n^3$, placed on the tube. Within swivel N' a spring, $n^4$, is placed on tube M, one end of said spring pressing against a pin in a slot and the other pressing against swivel-head $n^3$, which is connected by a bar or rod, O, with the lower end of the ratchet-dog $h^4$. From the construction of tube M and intermediate connections with wheel I, the latter being connected with the ratchet K toward its outer end, when said tube is drawn outward, the outer end of the ratchet is drawn from engagement with toothed wheel L and the inner end of the ratchet is moved into engagement with the teeth of said wheel.

A swivel, P, is mounted on shaft H, and is connected with tube M by swivel-head $n$. A spiral spring, $p$, is placed within the swivel, one end of the spring pressing against the head $n$ of the tube and the other end bearing against a fixed pin, $p'$, in a slot and washer $p^2$ on the shaft. The said spring, pressing tube M inward from the intermediate connections with ratchet K described, presses the outer end of said ratchet into engagement with the teeth of wheel L.

The operating-shaft H is secured from any movement endwise by the collars $q$, one being placed on the shaft within a division of each shaft-bearing $f$, as shown, and is secured by a set-screw. The said shaft is also provided with bearings Q and R, the stocks of which are made fast to beam A. The bearing R is bifurcated to receive the shaft.

S indicates a rocking rod, which has at its rear end a bearing carried by the axle S' in rear of traction-wheel F, the said rod being provided with a handle, $r$. The forward end of rod S is pivotally connected with a vertical rocking lever, $r'$, pivotally secured to the stock of bearing R, so that a rocking movement of the rod imparts a rocking movement to the lever. A bent lever, $r^2$, is pivoted at its lower end to the stock of bearing R, the upper end of the lever being forked, receiving shaft H, and being in position to engage with swivel P. A bent rocking lever, $r^3$, is pivoted to the stock at $z$, and is forked at its upper end to receive shaft H, and is in position to connect with the large swivel N'. The two pivoted levers $r^2$ and $r^3$ are in positions to be operated severally by the impinging of the rocking lever $r'$, and when said lever $r'$ is, by means of handle $r$, turned to the right it moves against lever $r^2$, which is thus moved to the right, and the swivel P and tube M, having connection with wheel I, being drawn outward, the outer end of ratchet K is drawn from wheel L. When the lever $r'$ is swung to the left, it moves against the lower end of pivoted lever $r^3$, and said lever, turning on its pivot, draws swivel N' to the right, and through swivel-head $n^3$ and connecting-rod O the lower end of ratchet-dog $h^4$ is drawn outward, thereby closing the upper part of the dog against the supplementary ratchet $h^3$ and pressing it into engagement with wheel L.

When the outer end of the two-arm ratchet K is withdrawn from engagement with wheel L, the inner end is driven into engagement with said wheel; but the inner end has a certain distance to move before closing against a tooth of the wheel, such distance being equal to about half the width of a tooth, thus causing a short pause in the movement of wheel L, and consequently the drop of seed is so much later than it otherwise would be.

When the ratchet $h^3$ is pressed forward by the dog $h^4$, it will engage with the teeth of wheel L, and when sufficiently pressed it will force wheel L forward, so that the outer arm of ratchet K will be drawn close to outer end of $h^3$, and will connect with a tooth next in rear of the one it previously engaged with.

The sliding seed-bar C has two rollers, $s$ and $s'$, mounted on bolts fixed to the upper side of said bar, said rollers being located in positions to be impinged against alternately by the opposite angular wings or projections $m^2$ and $m^3$ on wheel L during the revolutions of said wheel, so that one roller is pressed by a wing on said wheel at every quarter of a revolution, causing a movement of the seed-bar. Thus a reciprocating movement is imparted to the seed-bar by the projecting wings $m^2$ and $m^3$ acting alternately against the rollers $s$ and $s'$, respectively, said bar being moved back and forward twice during each revolution of the wheel.

The inner bearing, Q, of shaft H, projecting laterally on one side, has a beveled shoulder, $t$, to engage with a similar beveled shoulder, $t'$, on a bearing, T, on said shaft. From said bearing T an adjusting-arm, $u$, projects downward and a spring, $u'$, projects upward to a point opposite and near the ratchet-teeth $m$ on wheel L, a tooth, $u^2$, being formed at the upper end of the spring. A swinging movement of adjusting-arm $u$ partially rotates the bearing T, which is caused by the beveled parts $t$ $t'$ to make a lateral movement on the shaft toward wheel L and the tooth $u^2$, to connect with the teeth $m$ and produce a forward movement of wheel L. Such movement may be effected by means of a rod, $u^3$, which is connected at one end with the lower end of arm $u$, the other end of the rod being connected with a foot-lever, U, having a pivotal bearing on the rear axle, S'. A spiral spring, $u^4$, on the shaft H presses the bearing T outward, keeping the spring $u'$ from engagement with teeth $m$ when the adjusting-arm $u$ is not operated.

V indicates the marker-rods, provided with pointed concave shovels $v$, secured to their extremities, one marker-rod being secured to each end of the shaft H by means of a yoke, $v'$, having a socket or sleeve, $v^2$, placed on the end of the shaft and secured thereto. The rod V is passed through apertures in the sides of the yoke, extending therefrom usually between two and three feet in each direction. To the center of the rod is fastened a plate, $v^3$, on each side of which is a spring, $v^4$, placed on the rod, each spring pressing against plate $v^3$ and the inner side of the yoke. The springs yield when the markers strike anything too hard to penetrate, so that the planter-runners are not lifted from the ground.

As the planter is drawn across the field the leveling-plow enters the ground a suitable distance to make a track in which the traction-wheel travels, the shovel-pointed prongs entering the ground such distance as may be necessary to furnish the power required to drive the operating mechanism. The traction-wheel in each revolution measures exactly the same distance, and a like uniform movement is imparted to the sprocket-wheel I, from which it is imparted through ratchet K to wheel L, through which the seed-bar is actuated, and to the marking-rods on the ends of shaft H, the entire mechanism being thus driven by the traction-wheel F.

When turning the planter at the border of the field or when moving it from place to place, the traction-wheel may be raised from the ground by means of the same appliances by which the planter-runners are raised, and wheel F being lifted, the operation ceases instantaneously. When from any cause the marking of the markers is inaccurate and on a line somewhat in rear of the line of the marks last previously made, the driver, without stopping the planter, can move the handle of rocking rod S to the left, which actuates the pivoted lever $r^3$, drawing outward swivel N', and through connecting-rod O actuates the ratchet-dog $h^4$, which presses the ratchet $h^3$ into connection with teeth on wheel L and forces the wheel one tooth forward, making an increase in the distance to the next marks of about two inches.

Should it become necessary from any cause to shorten the distance between the rows, the driver can move the handle of rod S to the right and actuate the lever $r^2$, by which the swivel P is drawn outward, and through connecting-tube and sprocket-wheel connecting with ratchet K the upper end of the latter is drawn from engagement with wheel L and the lower end is forced into engagement, by which movement the shaft and markers lose the operation of one tooth on wheel L, lessening the distance to the next marks about two inches.

The distance between hills may be increased or diminished by varying the relative sizes of the two sprocket-wheels connected by the chain J. The small sprocket-wheel being reduced in size or the large one increased, the planting will be at points farther apart. Therefore the operating devices may be used for drilling seed, in which case the markers should be removed.

I claim—

1. In corn-planters, the combination of the wheel I, having side lug, $g$, ratchet K, having a side lug on each arm, and the laterally-toothed wheel for operating the seed-bar, said elements coacting as and for the purpose set forth.

2. In a planter, in combination with a shaft, H, a two arm ratchet having a lateral tooth on each arm and being pivoted to a perforated block in a central opening in the ratchet, and an adjacent wheel which imparts motion to the seed-bar, said wheel being provided with teeth adapted for engagement with the ratchet, substantially as set forth and described.

3. The two arm ratchet K, mounted on a shaft, H, and having ratchet $h^3$ and ratchet-dog $h^4$, pivoted thereto, in combination with wheel I, connected with an arm of the ratchet and provided with driving mechanism, and a wheel adjacent to the ratchet and provided with lateral teeth $m'$ and with lateral projections to actuate the seed bar, substantially as set forth.

4. In combination with shaft H, a two-arm ratchet mounted thereon and provided with a lateral tooth on each arm, said ratchet having a slight swinging movement, a wheel adjacent to the ratchet and having lateral teeth for engagement therewith, said wheel being provided with projecting wings $m^2 m^3$, and seed-bar provided with rollers $s$ and $s'$ in position to engage with the last-mentioned wheel, substantially as shown and described.

5. In combination with shaft H, a tube placed on said shaft and having an annular flange, $n$, on its outer end, its inner end having a swivel-connection with the hub of wheel I, a swivel, P, connected with the outer end of the tube, a spring placed within the swivel and pressing against the outer end of the tube, and suitable means for moving swivel P on the shaft outward, substantially as set forth and described.

6. In combination with shaft H and a connection-tube thereon, a grooved swivel-head, $n^3$, placed on the tube and connected by a rod, O, with the ratchet-dog pivoted to the ratchet K, a swivel, N', on the tube and connected at one end with swivel-head $n^3$, which is pressed by a spring placed on the tube and within the swivel, and suitable means for drawing swivel N' outward on the shaft, substantially as and for the purposes set forth.

7. In combination with shaft H, a fixed bearing, Q, for said shaft, said bearing being provided with a beveled shoulder, $t$, a swinging arm, $u$, having a bearing, T, provided with a beveled shoulder, $t'$, and carrying a spring, $u'$, a rod connected with arm $u$ and provided with a lever for drawing the rod, and an adjacent wheel on the shaft H, provided with lateral teeth $m'$ and carrying devices for engaging with the seed-bar, substantially as set forth.

In testimony whereof I have affixed my signature in presence of two witnesses.

JENS HANSEN JENSEN.

Witnesses:
ANDREW JENSEN,
H. P. ANDERSON.